(12) United States Patent
Bear et al.

(10) Patent No.: US 12,460,708 B1
(45) Date of Patent: Nov. 4, 2025

(54) DRIVE ASSEMBLY INCLUDING SEAMLESS SHIFTING MECHANISM

(71) Applicant: Schaeffler Technologies AG & Co. KG, Herzogenaurach (DE)

(72) Inventors: Luke Bear, Chardon, OH (US); Joshuah Fisher, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/742,547

(22) Filed: Jun. 13, 2024

(51) Int. Cl.
*F16H 48/40* (2012.01)
*B60K 1/00* (2006.01)
*F16H 37/08* (2006.01)

(52) U.S. Cl.
CPC .............. *F16H 48/40* (2013.01); *B60K 1/00* (2013.01); *F16H 37/0813* (2013.01)

(58) Field of Classification Search
CPC ...... B60K 1/00; B60K 1/02; B60K 2001/001; B60K 17/16–165; B60K 17/20; H02K 7/006; H02K 7/116; B60L 15/007; B60L 15/2036; F16H 2200/0021; F16H 37/04; F16H 37/042; F16H 37/043; F16H 2037/044–045; F16H 37/06–065; F16H 37/08–0813; F16H 37/0826
See application file for complete search history.

(56) References Cited

U.S. PATENT DOCUMENTS

| | | | | | |
|---|---|---|---|---|---|
| 2,152,771 | A | * | 4/1939 | Ormsby | F16H 37/0813 74/473.1 |
| 2,324,713 | A | * | 7/1943 | Mcfarland | F16H 47/08 475/44 |
| 2,521,730 | A | * | 9/1950 | Keese | F16H 48/08 192/48.91 |
| 2,858,713 | A | * | 11/1958 | Brownyer | F16H 37/046 475/203 |
| 10,525,827 | B2 | * | 1/2020 | Han | B60W 10/02 |
| 11,713,799 | B2 | * | 8/2023 | Maurel | F16H 61/14 475/150 |

FOREIGN PATENT DOCUMENTS

| | | | | |
|---|---|---|---|---|
| CN | 203082129 U | * | 7/2013 | |
| CN | 104534047 A | * | 4/2015 | F16H 37/08 |
| CN | 212022304 U | * | 11/2020 | |
| WO | WO-2022176681 A1 | * | 8/2022 | |

* cited by examiner

*Primary Examiner* — James J Taylor, II
(74) *Attorney, Agent, or Firm* — Davidson Kappel LLC

(57) ABSTRACT

A drive assembly for a drive train of a motor vehicle includes a differential configured for driving a first axle and a second axle while allowing the first axle and the second axle to rotate about a center axis at different speeds than each other. The drive assembly also includes a first gear set continuously drivingly connected to the differential for inputting a first torque to the differential, and a second gear set continuously drivingly connected to the differential for inputting a second torque to the differential. The first torque is lower than the second torque. The drive assembly further includes a clutch actuatable between a first orientation in which the clutch drives the first gear set to transmit the first torque to the differential, and a second orientation in which the clutch drives the second gear set to transmit the second torque to the differential.

13 Claims, 10 Drawing Sheets

DRIVE ASSEMBLY INCLUDING SEAMLESS SHIFTING MECHANISM

TECHNICAL FIELD

The present disclosure relates generally to a motor vehicle axle, and more specifically to an electric vehicle axle including a differential.

BACKGROUND

Motor vehicle drive trains are known that include a shifting mechanism that is far upstream from the differential.

SUMMARY

A drive assembly for a drive train of a motor vehicle includes a differential configured for driving a first axle and a second axle while allowing the first axle and the second axle to rotate about a center axis at different speeds than each other. The drive assembly also includes a first gear set continuously drivingly connected to the differential for inputting a first torque to the differential, and a second gear set continuously drivingly connected to the differential for inputting a second torque to the differential. The first torque is lower than the second torque. The drive assembly further includes a clutch actuatable between a first orientation in which the clutch drives the first gear set to transmit the first torque to the differential, and a second orientation in which the clutch drives the second gear set to transmit the second torque to the differential.

In examples, the first gear set includes a first final drive gear drivingly connected to the differential for inputting the first torque to the differential, the second gear set including a second final drive gear drivingly connected to the differential for inputting the second torque to the differential, the first final drive gear and the second final drive gear being mounted on the differential.

In examples, the differential includes a cover for inputting torque into the differential, the first final drive gear being fastened to the cover of the differential, the second final drive gear being fastened to the cover of the differential.

In examples, the drive assembly further includes an input shaft, the first gear set includes a first input gear coaxial to the input shaft, and the second gear set includes a second input gear coaxial to the input shaft.

In examples, the clutch is configured for drivingly connecting the first input gear to the input shaft in the first orientation and drivingly connects the second input gear to the input shaft in the second orientation.

In examples, the clutch is a dog clutch including splines on an inner circumference thereof that are configured or engaging splines of the first input gear in the first orientation and splines of the second input gear in the second orientation.

In examples, the first gear set includes a first final drive gear drivingly connected to and mounted on the differential for inputting the first torque to the differential, the first input gear being directly drivingly connected to the first final drive gear.

In examples, the first final drive gear has a diameter that is greater than a diameter of the first input gear.

In examples, the first gear set includes a first final drive gear drivingly connected to and mounted on the differential for inputting the first torque to the differential, the second input gear being drivingly connected to the second final drive gear by at least one intermediate gear.

In examples, the at least one intermediate gear includes an upstream intermediate gear directly drivingly connected to the second input gear and a downstream intermediate gear directly drivingly connected to the second final drive gear.

In examples, a diameter of the upstream intermediate gear is greater than a diameter of the second input gear.

In examples, the downstream intermediate gear has a smaller diameter than the upstream intermediate gear.

In examples, the upstream intermediate gear and the downstream intermediate gear are non-rotatably fixed together.

In some aspects, the techniques described herein relate to a drive assembly, further including an actuator for axially actuating the clutch between the first orientation and the second orientation.

In examples, the first gear set, the second gear set and the differential are rotatable around an axis shared by the first axle and the second axle.

In examples, the first gear set includes a first input gear and the second gear set includes a second input gear, the clutch configured for directly drivingly connecting to a first output section non-rotatably fixed to the first input gear in the first orientation and for directly drivingly connecting to a first output section non-rotatably fixed to the second input gear in the second orientation, the first gear set and the second gear set being positioned between a pinion axis and an output axis of the differential.

A drive assembly for a drive train of a motor vehicle is also provided that includes a first gear set drivingly connected to a differential for inputting a first torque to the differential, and a second gear set drivingly connected to the differential for inputting a second torque to the differential. The first torque is lower than the second torque. The drive assembly further includes a clutch actuatable between a first orientation in which the clutch drives the first gear set to transmit the first torque to the differential, and a second orientation in which the clutch drives the second gear set to transmit the second torque to the differential. The first gear set includes a first input gear non-rotatably connected to the clutch in the first orientation, and the second gear set including a second input gear non-rotatably connected to the clutch in the second orientation. The first input gear and the second input gear are coaxial to each other.

In examples, wherein the first gear set includes a first final drive gear drivingly connected to the differential for inputting the first torque to the differential; the second gear set including a second final drive gear drivingly connected to the differential for inputting the second torque to the differential, the first final drive gear and the second final drive gear being mounted on a cover of the differential coaxial to each other.

A method of constructing a drive assembly of a drive train of a motor vehicle is also provided. The method includes non-rotatably connecting a first final drive gear of a first gear set to an input of a differential for inputting a first torque to the differential; non-rotatably connecting a second gear set to the input of the differential for inputting a second torque to the differential; and drivingly connecting a clutch to an input of the first gear set and an input of the second gear set. The clutch is actuatable between a first orientation in which the clutch transmits the first torque to the input the first gear set and a second orientation in which the clutch transmits the second torque to the input of the second gear set.

In examples, the non-rotatably connecting of the first final drive gear of the first gear set to the input of the differential includes fastening the first final drive gear of the first gear set to a cover of the differential; and the non-rotatably connecting of the second final drive gear of the second gear set to the input of the differential includes fastening the second final gear of the second gear set to the cover of the differential.

BRIEF DESCRIPTION OF THE DRAWINGS

The present disclosure is described below by reference to the following drawings, in which.

DETAILED DESCRIPTION

Figure 1:
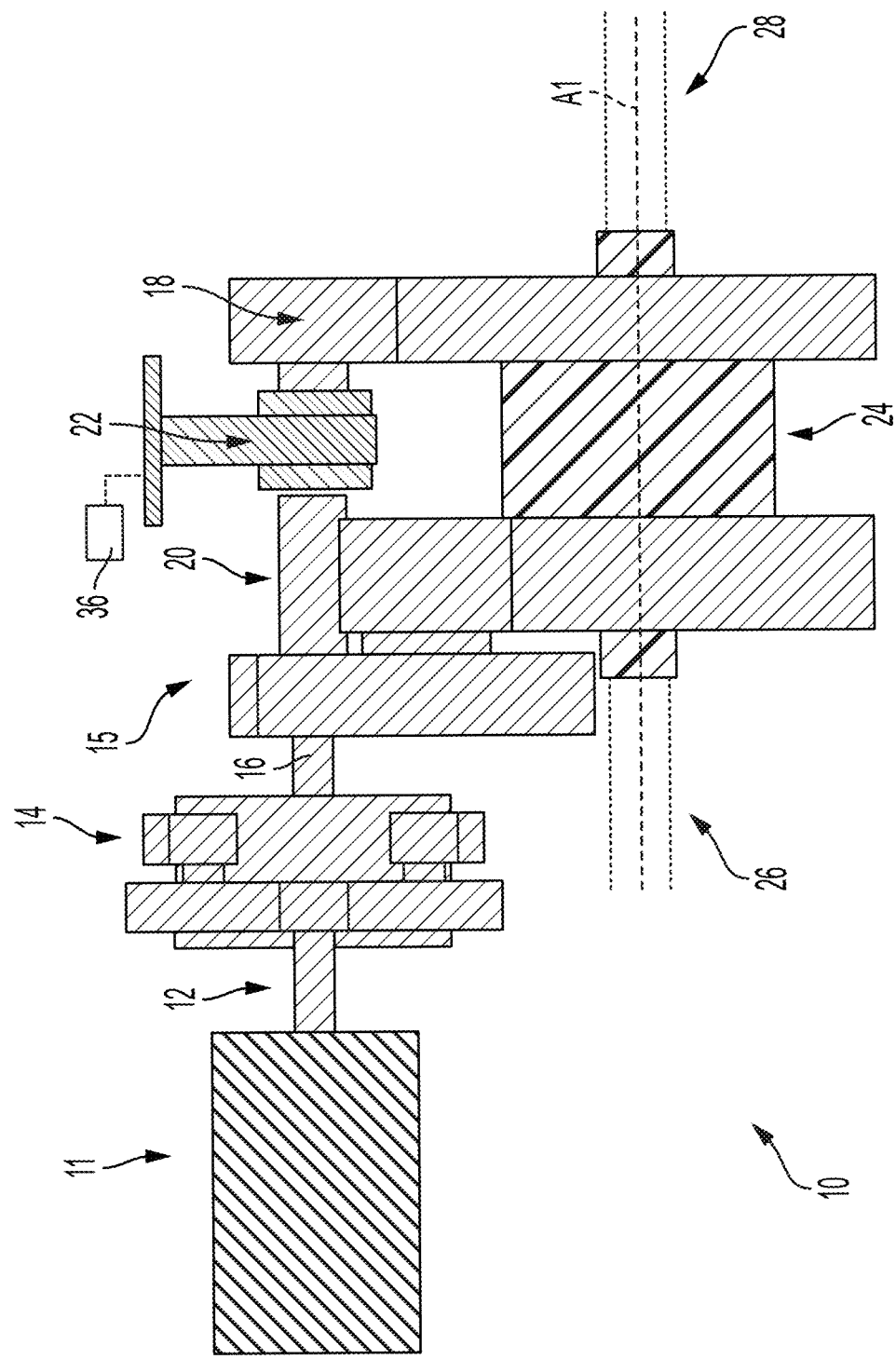
FIG. 1 schematically shows a motor vehicle drive assembly including a motor and a drivetrain.
Figure 2:
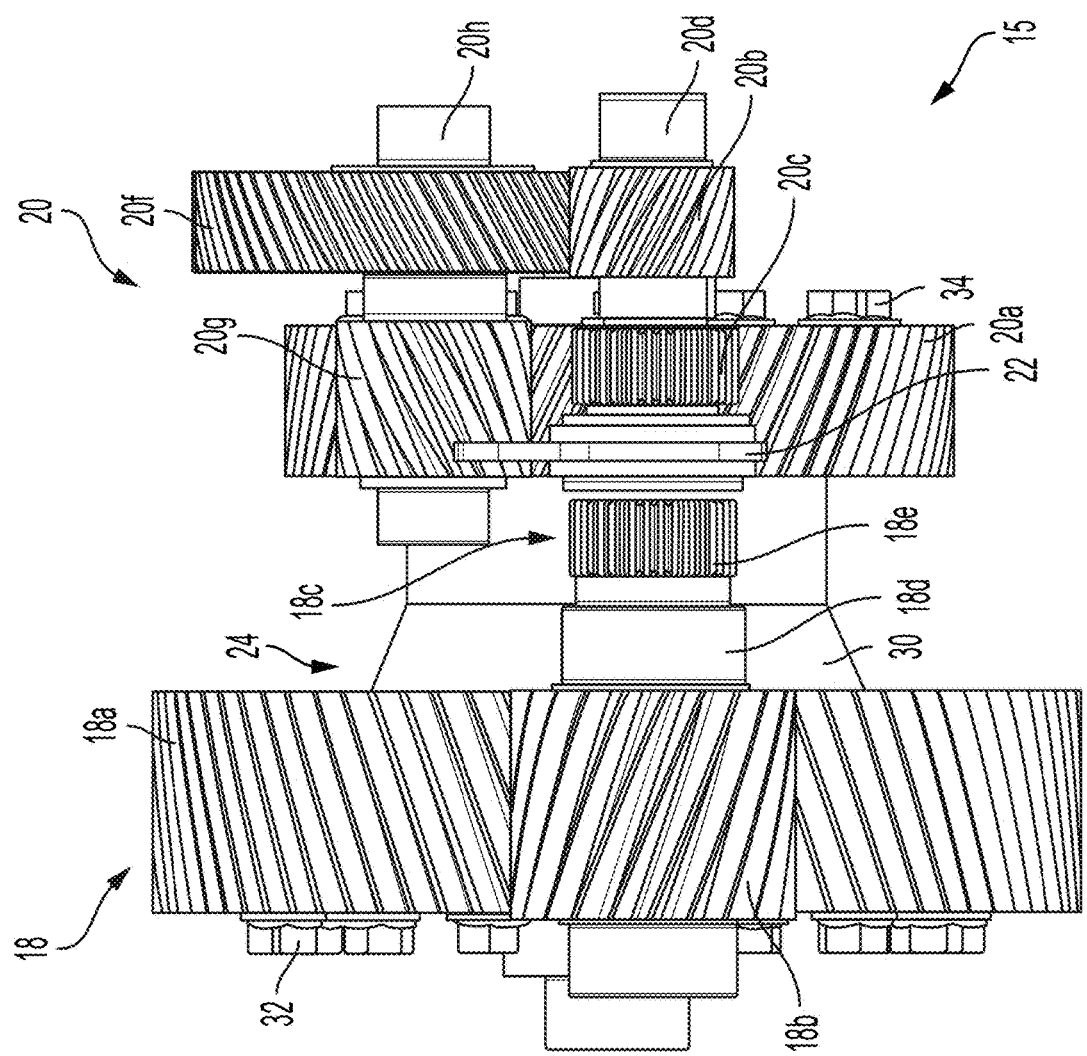
FIG. 2 shows a front view of a gear assembly of the drivetrain shown in FIG. 1.
Figure 3:
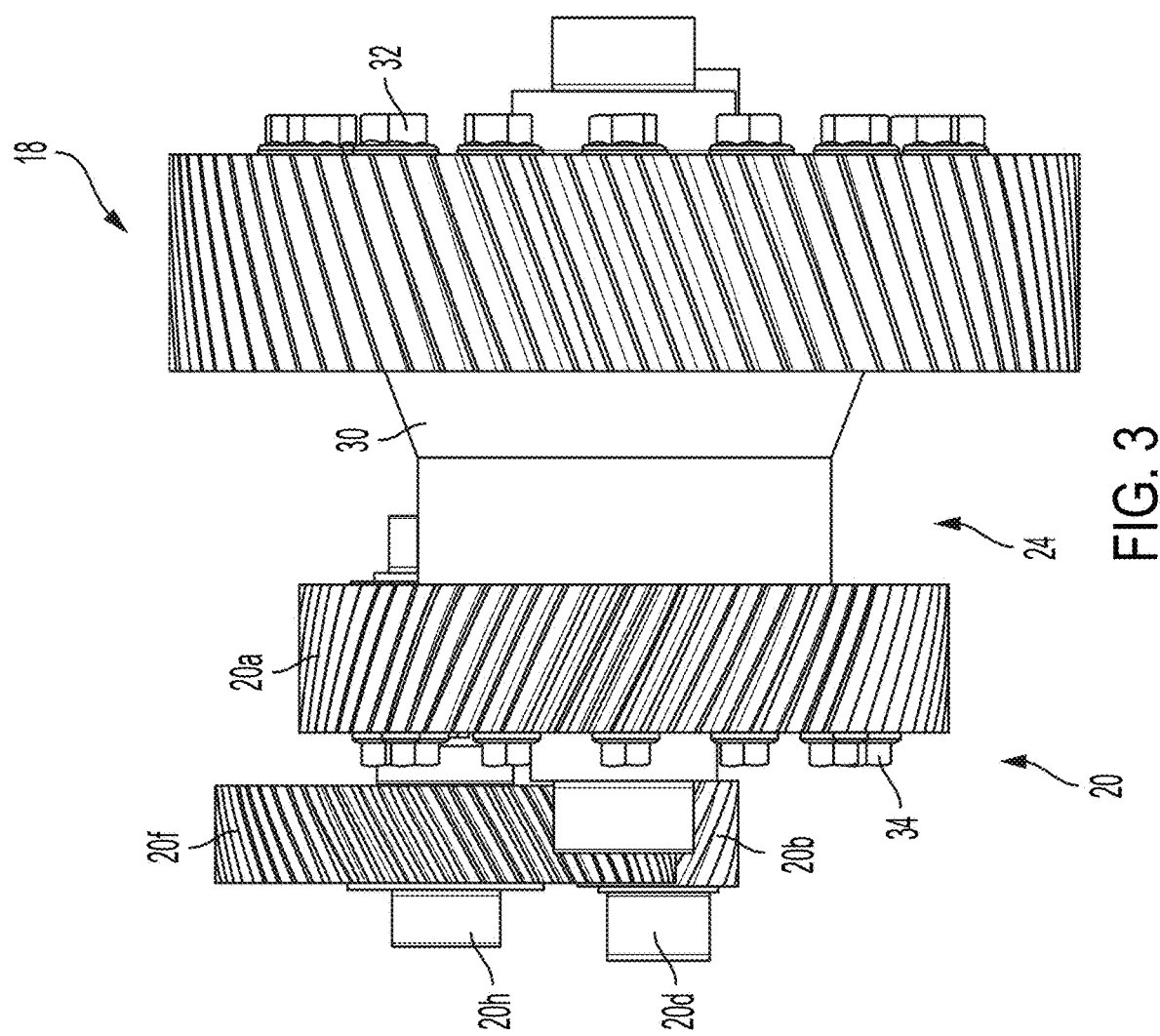
FIG. 3 shows a back view of the gear assembly shown in FIG. 2.
Figure 4:
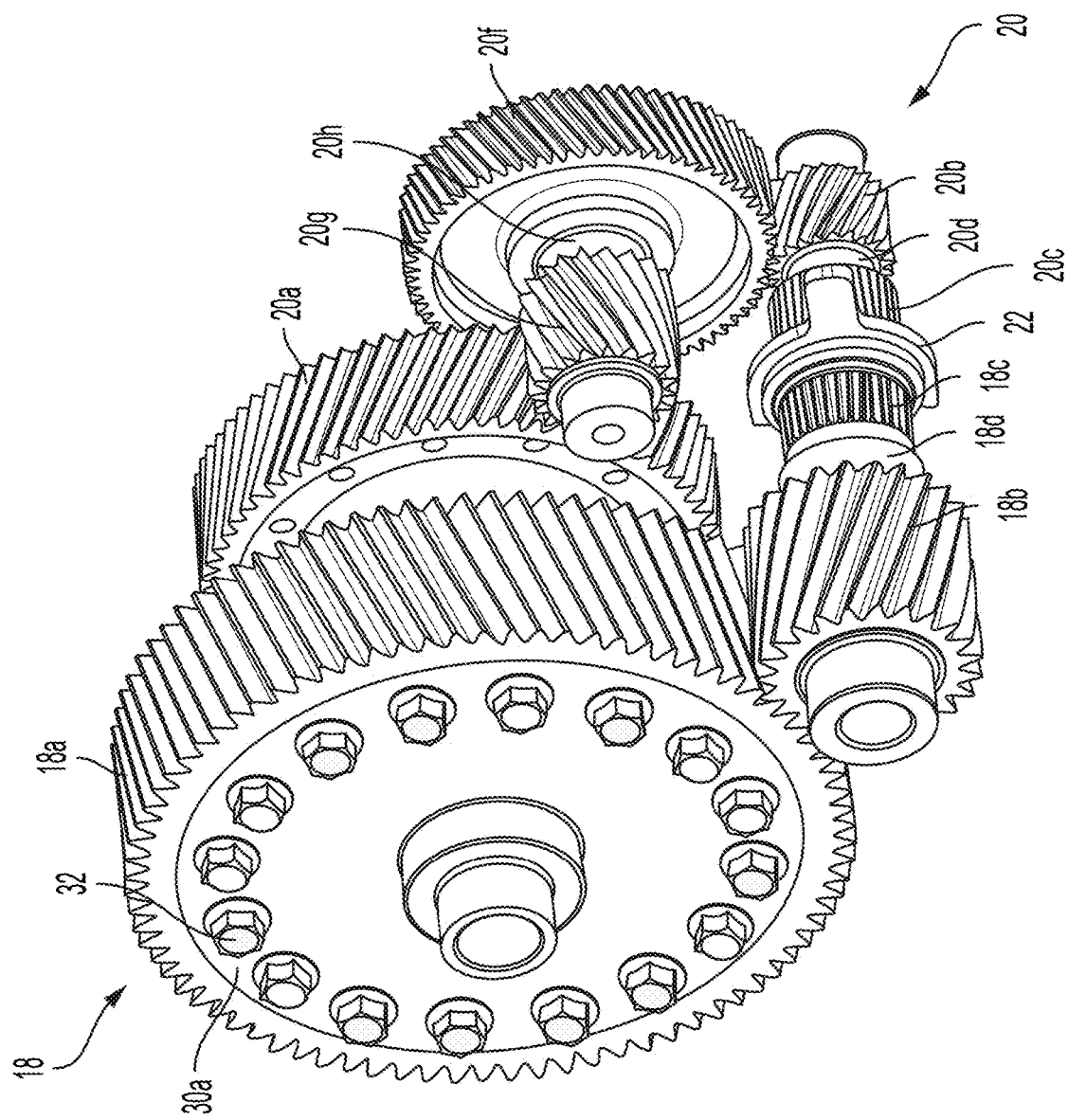
FIG. 4 shows a perspective view of the gear assembly shown in FIGS. 2 and 3.
Figure 5:
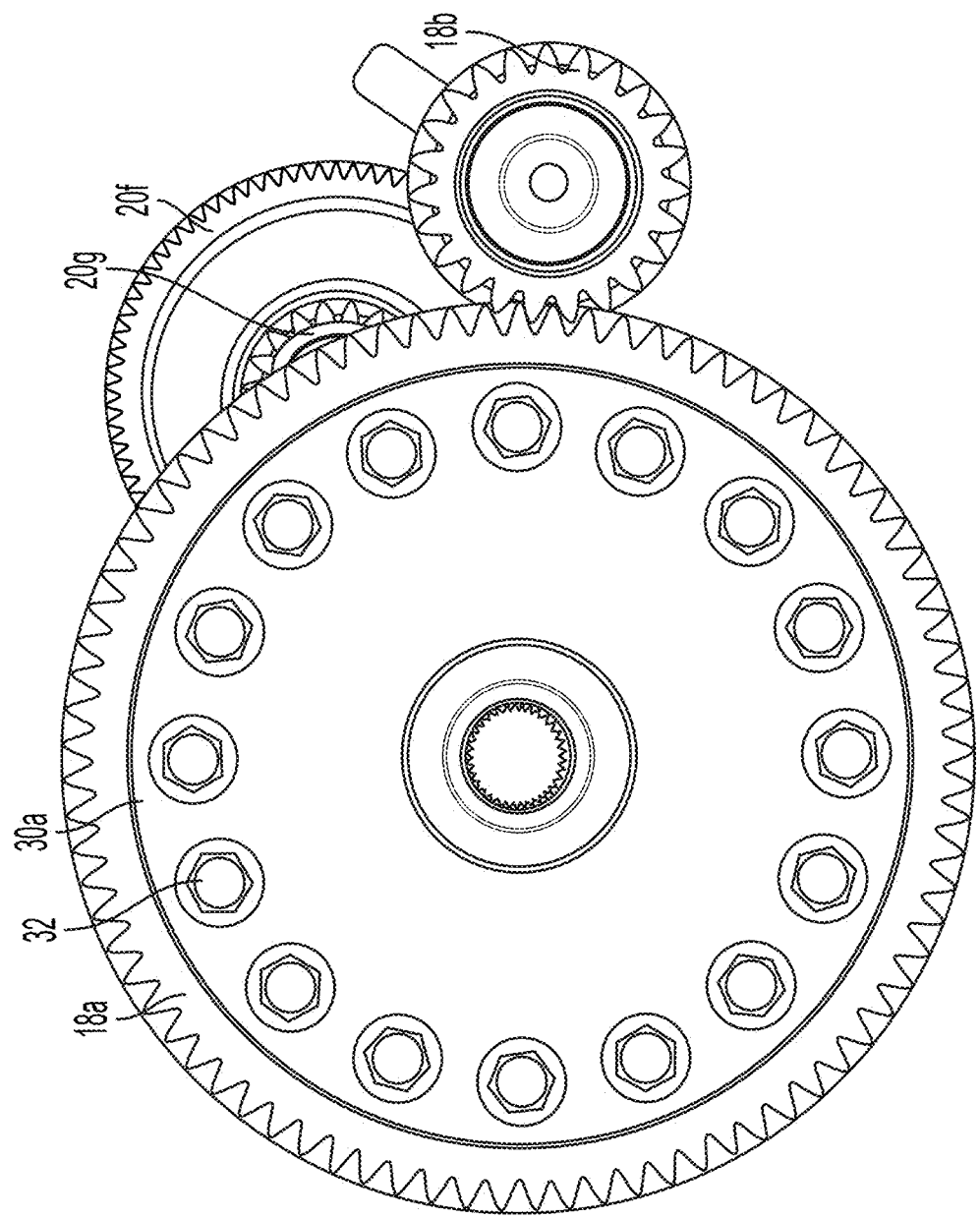
FIG. 5 shows a second side view of the gear assembly shown in FIGS. 2 to 4.
Figure 6:
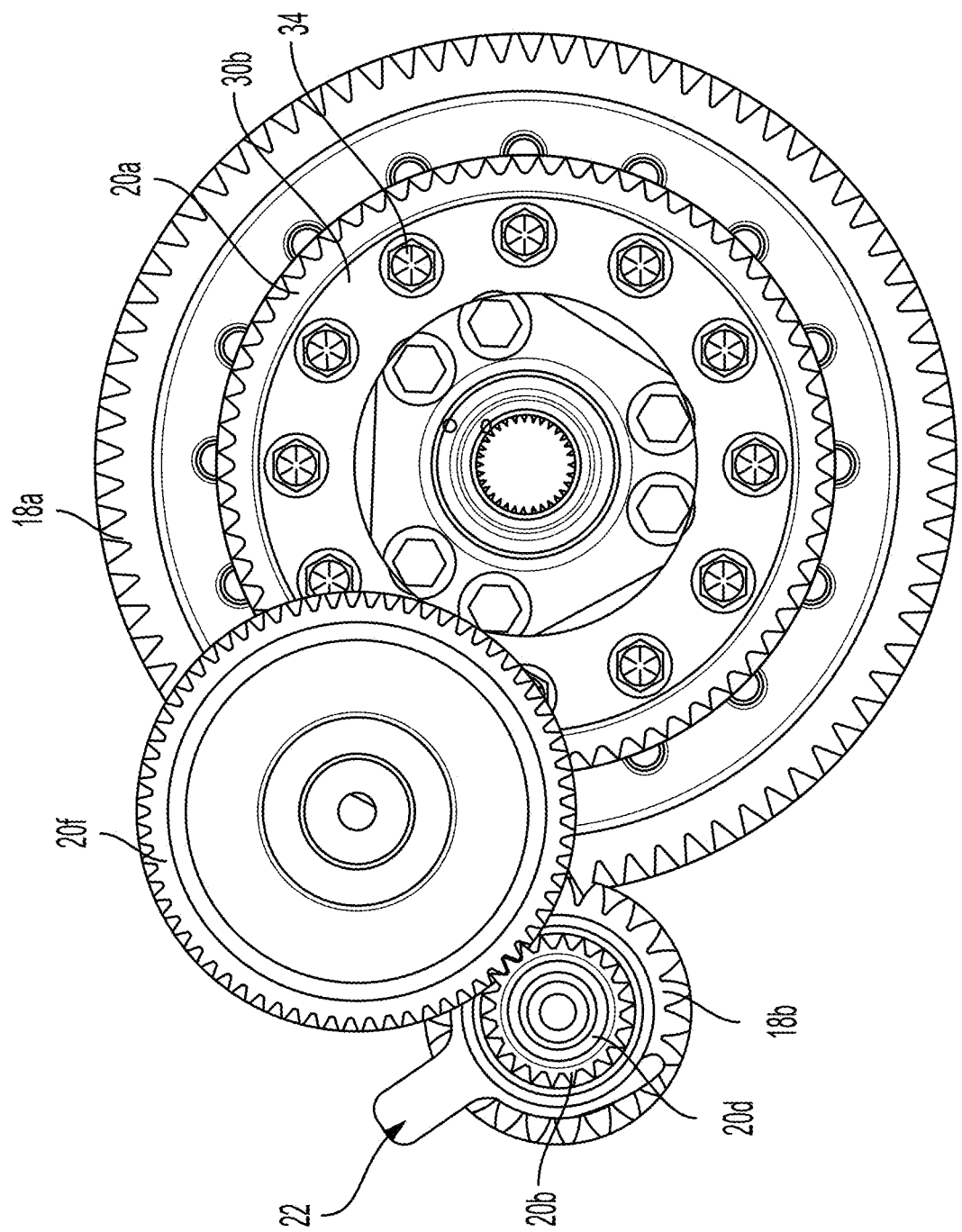
FIG. 6 shows a second side view of the gear assembly shown in FIGS. 2 to 5.
Figure 7:
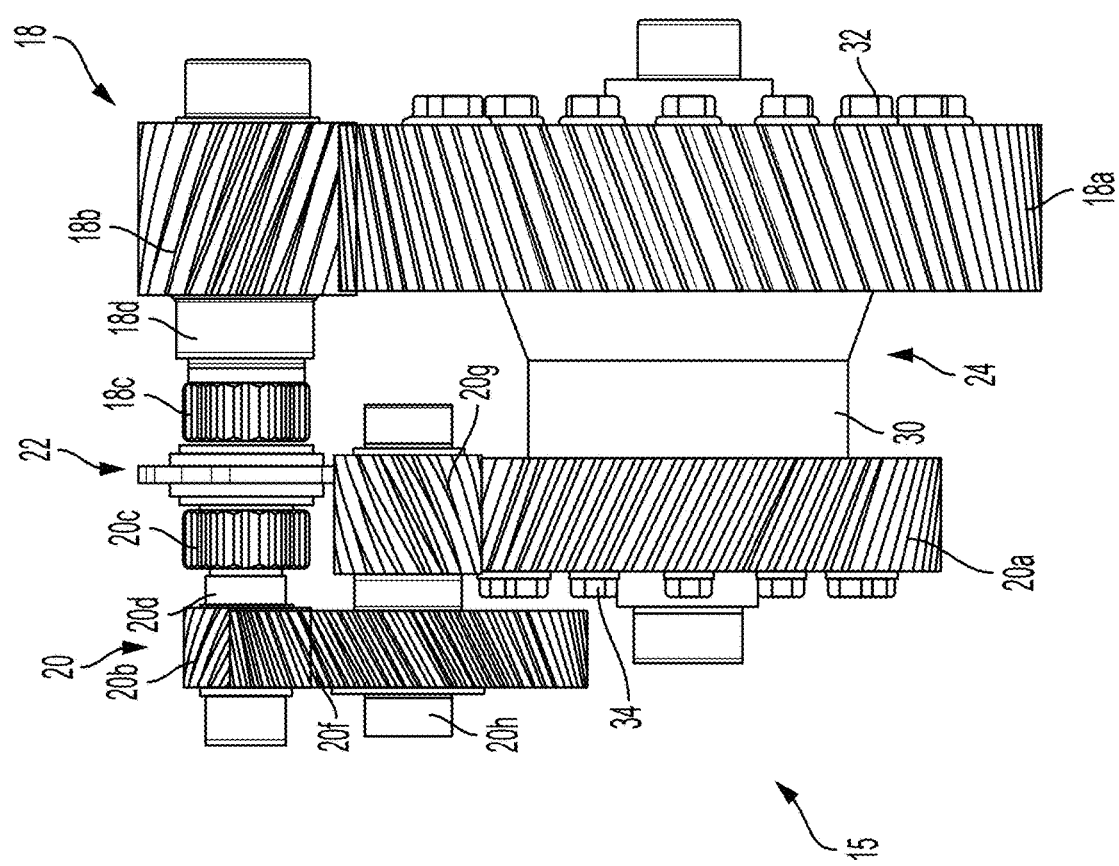
FIG. 7 shows a top view of the gear assembly shown in FIGS. 2 to 6.

FIGS. 1 to 10 show different views of a drive assembly 10 for a drive train of a motor vehicle including a motor 11, which can be an electric motor, and a drive train including, in sequential order, a motor output shaft 12, a planetary gear set 14, and a gear assembly 15. The gear assembly can include an input shaft 16, a first gear set 18, a second gear set 20, a clutch 22 and a differential 24.

Figure 8:
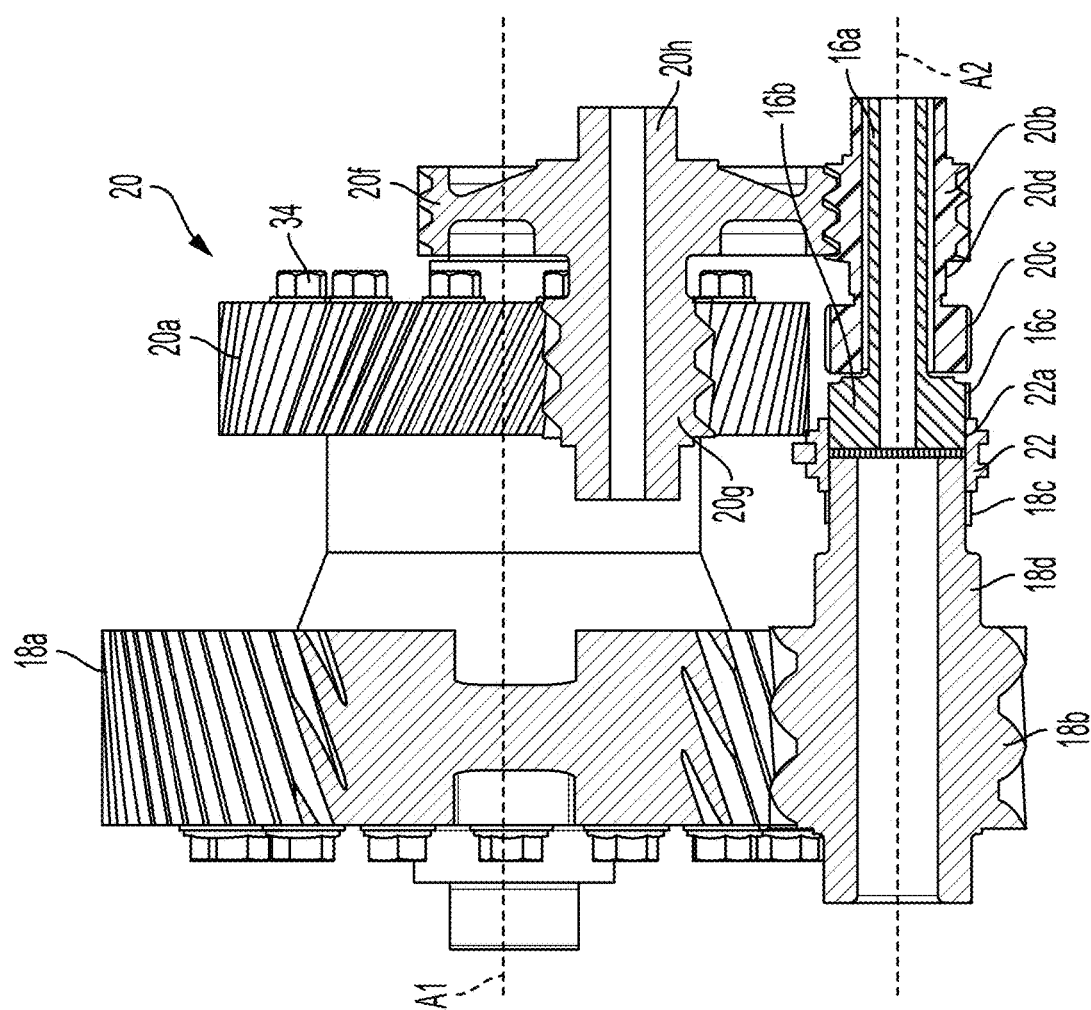
FIG. 8 shows a cross-sectional view of a clutch of the gear assembly shown in FIGS. 2 to 7 drivingly connected to a first gear set in a first orientation of the clutch.
Figure 9:
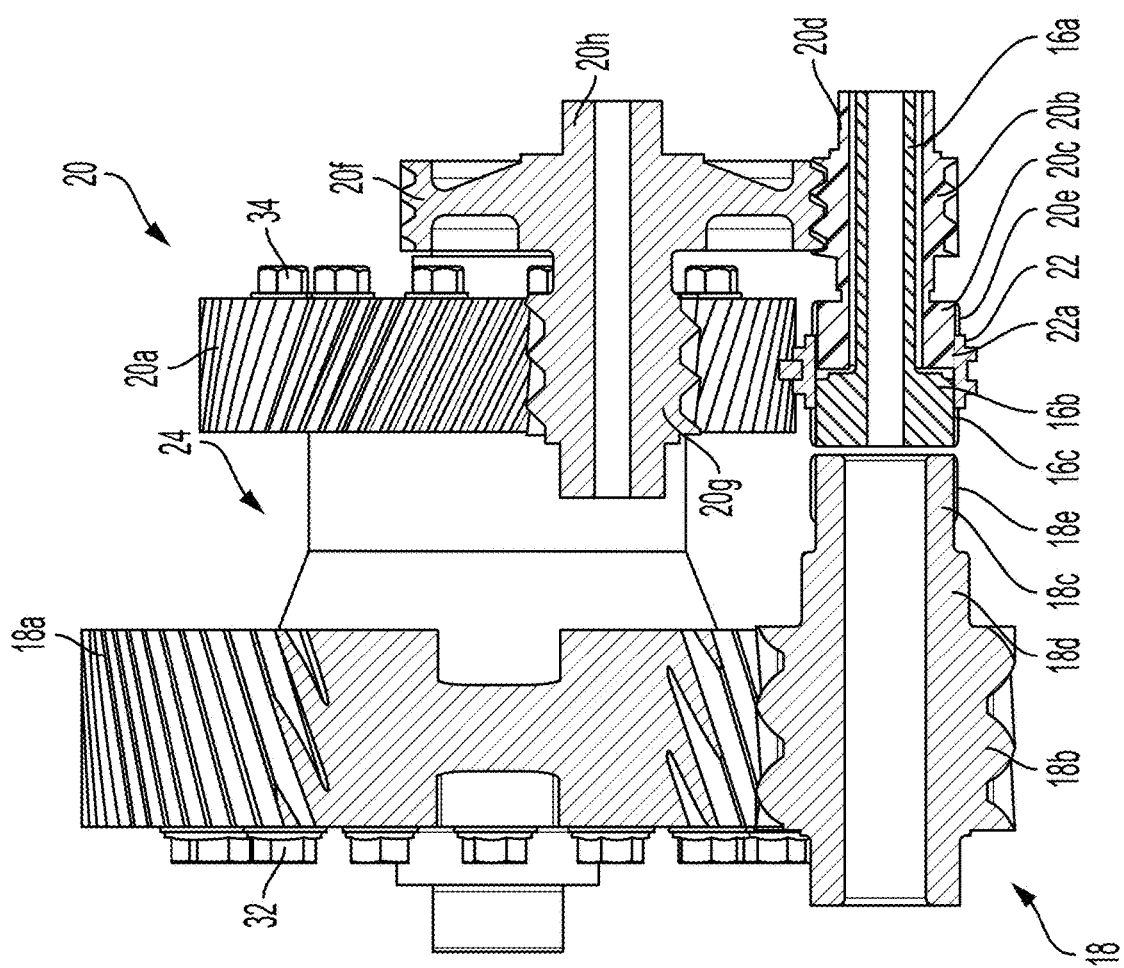
FIG. 9 shows a cross-sectional view of the clutch of the gear assembly shown in FIGS. 2 to 7 drivingly connected to a second gear set in a second orientation of the clutch.

The differential 24 is configured for driving a first axle 26 and a second axle 28 while allowing the first axle 26 and the second axle 28 to rotate about an output axis A1 of the differential at different speeds than each other. The first gear set 18 is continuously drivingly connected to the differential 24 for inputting a first torque to the differential 24. The second gear set 20 is continuously drivingly connected to the differential 24 for inputting a second torque to the differential 24. A maximum value of the first torque being lower than a maximum value the second torque, with a ratio of the maximum value of the first torque to the maximum value the second torque ranging from 4:1 to 1.5:1. As shown in FIGS. 8 and 9, the clutch 22 is actuatable between a first orientation (FIG. 8) in which the clutch drives the first gear set to transmit the first torque to the differential, and a second orientation (FIG. 9) in which the clutch 22 drives the second gear set 20 to transmit the second torque to the differential 24.

The input shaft 16 is driven by the motor 11, via the motor output shaft 12 and the planetary gear set 14, and the input shaft 16 transmits torque to the first gear set 18 through the clutch 22 when the clutch 22 is in the first orientation, and transmits torque to the second gear set 20 through the clutch 22 when the clutch 22 is in the second orientation.

Figure 10:
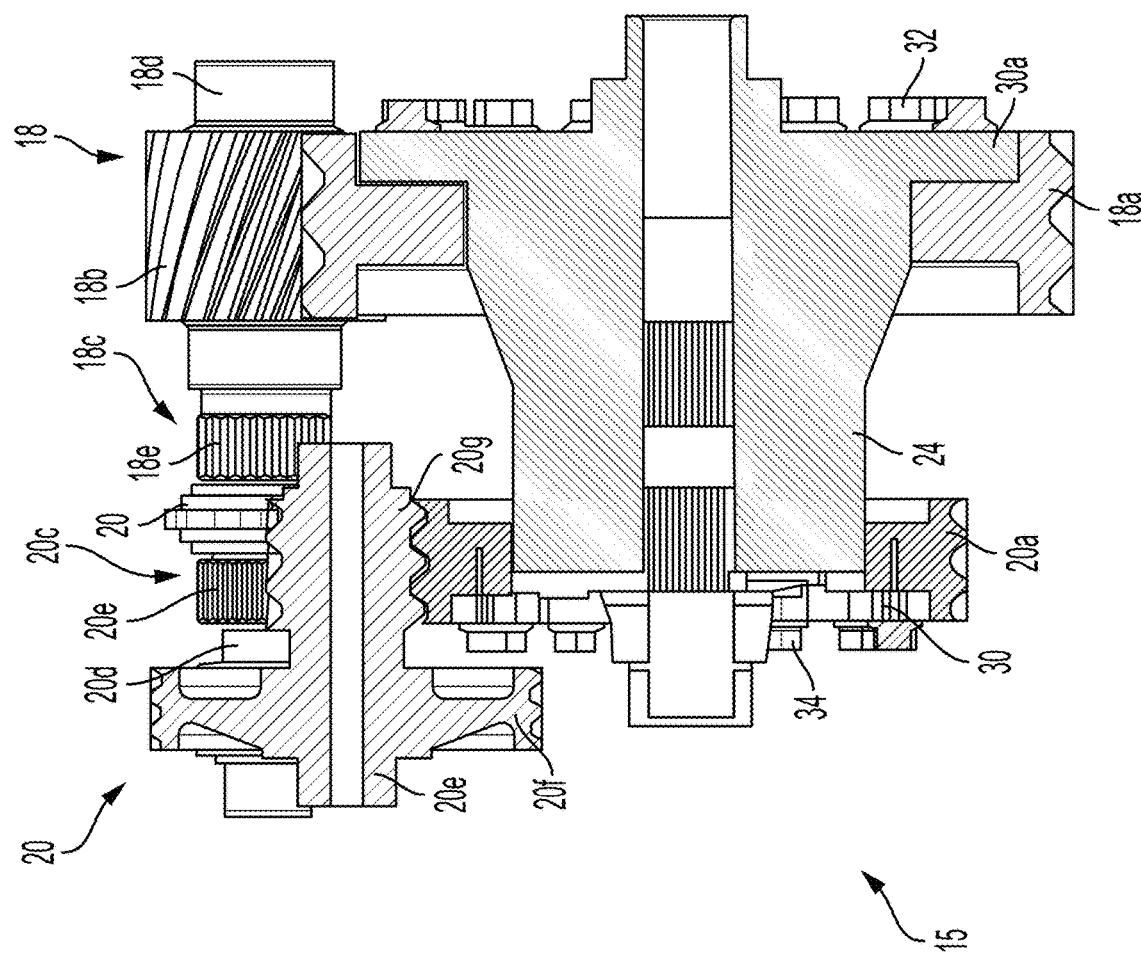
FIG. 10 shows a cross-sectional view of the gear assembly shown in FIGS. 2 to 7.

As shown in FIGS. 2 to 10, the first gear set 18 includes a first final drive gear 18a drivingly connected to the differential 24 for inputting the first torque to the differential 24. The second gear set 20 including a second final drive gear 20a drivingly connected to the differential 24 for inputting the second torque to the differential 24. The first final drive gear 18a and the second final drive gear 20a are mounted on the differential 24. The first final drive gear 18a is fastened to a cover 30 of the differential 24 by first fasteners 32. The cover 30 defines an input of the differential 24. The second final drive gear 20a is fastened to the cover of the differential 24 by first fasteners 32. As shown in FIG. 10, the first fasteners 32 can specifically be connected to a first flange 30a of cover 30, and the second fasteners 34 can specifically be connected to a second flange 30b of cover 30.

The first gear set 18 also includes a first input gear 18b, and the second gear set 20 includes a second input gear 20b. The first input gear 18b and the second input gear 20b are coaxial to the input shaft 16. The clutch 22 is non-rotatably connects to the first input gear 18b to the input shaft 16 in the first orientation of the clutch 22 (FIG. 8) and non-rotatably connects to the second input gear 20b to the input shaft 16 in the second orientation of the clutch 22 (FIG. 9). More specifically, the clutch 22 can directly drivingly engage a first input section 18c of the first gear set 18 and can directly drivingly engage a second input section 20c of the second gear set 20. First input section 18c is non-rotatably fixed to an end of a first drive shaft 18d, and first input gear 18b is also fixed to first drive shaft 18d. Second input section 20c is non-rotatably fixed to an end of a second drive shaft 20d, and second input gear 20b is also fixed to second drive shaft 20d.

In the example shown in FIGS. 1 to 10, the clutch 22 is a dog clutch including splines 22a on an inner circumference thereof that are configured or engaging splines 20e of the first input section 18c in the first orientation and splines 18e of the second input section 20c in the second orientation.

The first input gear 18b is directly drivingly connected to the first final drive gear 18a by teeth of the first input gear 18b intermeshing with teeth of the first final drive gear 18a. The first final drive gear 18a has a diameter that is greater than a diameter of the first input gear 18b.

The input shaft 16 extends from planetary gear set 14 and includes a base section 16a passing through an interior of second drive shaft 20d and an output section 16b at the end of base section 16a. The output section 16b is axially between second input section 20c and first input section 18c. The output section 16b includes splines 16c configured in the same manner as splines 18e and splines 20e. As shown in FIG. 8, drive shafts 18d, 20d and input shaft 16 are all centered on a common axis A2, with splines 16c, 18e, 20e being the same radial distance from common axis A2. The axis A2 is parallel to and radially spaced away from axis A1 of differential 24. The axis A2 is equal distances from the axis A1 of the differential 24 and the pinion axis A2 of a pinion.

Clutch 22 is axially slidable with respect to drive shafts 18d, 20d and input shaft 16, with splines 22a being axially slidable along splines 16c as clutch is axially actuated by an actuator 36 between the first orientation (FIG. 8) and the second orientation (FIG. 9). Because splines 22a of clutch 22 are always engaged with splines 16c of input shaft 16, input shaft 16 drives the clutch 22 and either the clutch 22 drives the first input gear 18b of the first gear set 18 in the first orientation (FIG. 8) and splines 22a engage splines 18e, or the clutch 22 drives the second input gear 20b of the second gear set 20 in the second orientation (FIG. 9) and splines 22a engage splines 20e. This results in a quick and seamless transition between the two gear sets 18, 20 while maintaining a continuous mesh during the shifting between the two gear sets 18, 20. Also, because both of the final drive gears 18a, 20a are bolted to the flanges 30a, 30b, this continuous mesh is provided to output the first and second torque to the axles 26, 28. The splines 18e, 20e are an equal in amount to synchronize to dog clutch 22.

The second gear set 20 also includes at least one intermediate gear for transmitting torque from the second input gear 20b to the second final drive gear 20a. An upstream intermediate gear 20f is drivingly connected to the second input gear 20b by teeth of the upstream intermediate gear 20f intermeshing with teeth of the second input gear 20b. A downstream intermediate gear 20g is drivingly connected to the second final drive gear 20a by teeth of the downstream intermediate gear 20g intermeshing with teeth of the second final drive gear 20a. The upstream intermediate gear 20f and the downstream intermediate gear 20g are non-rotatably connected by an intermediate shaft 20h. A diameter of the upstream intermediate gear 20f is greater than a diameter of the second input gear 20b. A diameter of the upstream intermediate gear 20f is greater than a diameter of the downstream intermediate gear 20g.

As illustrated in FIG. 8, in the first orientation of clutch 22, the input shaft 16 drives the clutch 22, and the clutch 22 drives the first gear set 18 to transmit the first torque to differential 24, by the clutch 22 engaging first input section 18c and driving the first input gear 18b, which directly drives the first final drive gear 18a, which drives the cover 30 of differential 24. The differential 24 in turn transmits the first torque to the first and second axles 26, 28.

As illustrated in FIG. 9, in the second orientation of clutch 22, the input shaft 16 drives the clutch 22, and the clutch 22 drives the second gear set 20 to transmit the second torque to differential 24, by the clutch 22 engaging second input section 20c and driving the second input gear 20b, which directly drives the upstream intermediate gear 20f, also driving the downstream intermediate gear 20g, which drives the second final drive gear 20a, which drives the cover 30 of differential 24. The differential 24 in turn transmits the second torque to the first and second axles 26, 28.

A method of constructing the drive assembly 10 can include non-rotatably connecting the output of the first gear set 18 to the input of the differential 24 for driving the differential 24, non-rotatably connecting the output of the second gear set 20 to the input of the differential 24 for driving the differential 24, and drivingly connecting the clutch 22 to the first gear set 18 and the second gear set 20. The clutch 22 is actuatable between the first orientation in which the clutch 22 transmits torque to the first gear set 18 and the second orientation in which the clutch 22 transmits torque to the second gear set 20. The non-rotatably connecting of the output of the first gear set 18 to the input of the differential 24 includes fastening the first final drive gear 18a of the first gear set 18 to a cover 30 of the differential 24. The non-rotatably connecting of the output of the second gear set 20 to the input of the differential 24 includes fastening the second final gear 20a of the second gear set 20 to the cover 30 of the differential 24.

REFERENCE NUMERALS 10 drive assembly
11 motor
12 motor output shaft
15 gear assembly
16 input shaft
16a base section
16b output section
16c splines
18 first gear set
18a first final drive gear
18b first input gear
18c first input section
18d first drive shaft
18e splines
20 second gear set
20a second final drive gear
20b second input gear
20c second input section
20d second drive shaft
20e splines
20f upstream intermediate gear
20g downstream intermediate gear
20h intermediate shaft
22 clutch
22a splines
24 differential
26 first axle
28 second axle
30 cover
30a first flange
30b second flange
32 first fasteners
34 second fasteners
36 actuator

What is claimed is:

1. A drive assembly for a drive train of a motor vehicle comprising:
    a differential configured for driving a first axle and a second axle while allowing the first axle and the second axle to rotate about a center axis at different speeds than each other;
    an input shaft;
    a first gear set continuously drivingly connected to the differential for inputting a first torque to the differential, the first gear set including a first input gear coaxial to the input shaft;
    a second gear set continuously drivingly connected to the differential for inputting a second torque to the differential, the first torque being lower than the second torque, the second gear set including a second input gear coaxial to the input shaft; and
    a clutch actuatable between a first orientation in which the clutch drives the first gear set to transmit the first torque to the differential, and a second orientation in which the clutch drives the second gear set to transmit the second torque to the differential,
    wherein the first gear set includes a first final drive gear drivingly connected to and mounted on the differential for inputting the first torque to the differential,
    the second gear set including a second final drive gear drivingly connected to the differential for inputting the second torque to the differential,
    the second input gear being drivingly connected to the second final drive gear by at least one intermediate gear,
    the at least one intermediate gear includes an upstream intermediate gear directly drivingly connected to the second input gear and a downstream intermediate gear directly drivingly connected to the second final drive gear.

2. The drive assembly as recited in claim 1, wherein the differential includes a cover for inputting torque into the differential, the first final drive gear being fastened to the cover of the differential,
the second final drive gear being fastened to the cover of the differential.

3. The drive assembly as recited in claim 1, wherein the clutch is configured for drivingly connecting the first input gear to the input shaft in the first orientation and drivingly connects the second input gear to the input shaft in the second orientation.

4. The drive assembly as recited in claim 3, wherein the clutch is a dog clutch including splines on an inner circumference thereof that are configured for engaging splines of the first input gear in the first orientation and splines of the second input gear in the second orientation.

5. The drive assembly as recited in claim 1, wherein the first gear set includes the first final drive gear drivingly connected to and mounted on the differential for inputting the first torque to the differential,
the first input gear being directly drivingly connected to the first final drive gear.

6. The drive assembly as recited in claim 5, wherein the first final drive gear has a diameter that is greater than a diameter of the first input gear.

7. The drive assembly as recited in claim 1, wherein a diameter of the upstream intermediate gear is greater than a diameter of the second input gear.

8. The drive assembly as recited in claim 7, wherein the upstream intermediate gear and the downstream intermediate gear are non-rotatably fixed together.

9. The drive assembly as recited in claim 1, wherein the downstream intermediate gear has a smaller diameter than the upstream intermediate gear.

10. The drive assembly as recited in claim 1, further comprising an actuator for axially actuating the clutch between the first orientation and the second orientation.

11. The drive assembly as recited in claim 1, wherein the first gear set, the second gear set and the differential are rotatable around the center axis shared by the first axle and the second axle.

12. The drive assembly as recited in claim 1, wherein the first gear set includes the first input gear and the second gear set includes the second input gear,
the clutch configured for directly drivingly connecting to a first output section non-rotatably fixed to the first input gear in the first orientation and for directly drivingly connecting to a second output section non-rotatably fixed to the second input gear in the second orientation,
the first gear set and the second gear set being positioned between a pinion axis and the center axis of the differential.

13. The drive assembly as recited in claim 1, wherein the first gear set includes the first final drive gear drivingly connected to the differential for inputting the first torque to the differential;
the second gear set including the second final drive gear drivingly connected to the differential for inputting the second torque to the differential,
the first final drive gear and the second final drive gear being mounted on a cover of the differential coaxial to each other.

* * * * *